United States Patent [19]
Barbanell

[11] Patent Number: 5,175,698
[45] Date of Patent: Dec. 29, 1992

[54] METHOD AND SYSTEM FOR TRANSFER FUNCTION MEASUREMENT

[75] Inventor: Joseph Barbanell, Pleasant Hill, Calif.

[73] Assignee: DZ Company, Concord, Calif.

[21] Appl. No.: 556,745

[22] Filed: Jul. 23, 1990

[51] Int. Cl.$^5$ ............................................. G06F 15/20
[52] U.S. Cl. .................................. 364/553; 324/603; 324/615
[58] Field of Search ............... 364/553, 484, 485, 487, 364/572, 576, 580, 481; 324/77 B, 603, 615

[56] References Cited

U.S. PATENT DOCUMENTS

| | | | |
|---|---|---|---|
| 3,526,761 | 9/1970 | Smith | 364/553 |
| 4,111,519 | 9/1978 | Gillis et al. | 350/314 |
| 4,509,132 | 4/1985 | Kavaya | 364/571.02 |
| 4,542,955 | 9/1985 | Graindorge et al. | 350/3.63 |
| 4,607,216 | 8/1986 | Yamaguchi et al. | 324/77 B |
| 4,607,914 | 8/1986 | Fienup | 350/320 |
| 4,625,238 | 11/1986 | Penney | 358/139 |
| 4,653,909 | 3/1987 | Kuperman | 356/124.5 |
| 4,713,782 | 12/1987 | Blackham | 364/553 |

OTHER PUBLICATIONS

Dorf, Modern Control Systems, Apr. 1983, pp. 38–39, 237–239, Addison-Wesley Publishing.
Stremler, Introduction to Communication Systems, Dec. 1982, 11–14, 38–40, 151–164, Addison-Wesley Publishing.
Moore: An Intro. to the Mathematics of Digital Signal Processing, Part II Computer Music Journal Vol. II, No. 2, pp. 45–46.
Lund & Azouit, Measurement of Two-Dimensional Optical System Modulation Transfer Function (MTF) by Computation of Second Order Speckle Statistics, pp. 166–173, SPIE vol. 192 Interferometory (1979).
Brüel & Kjaer Seminar Notes, Spectral Analysis in Sound and Vibration Seminar, Chapter 5, System Analysis 19 pages, Nov. 29, 1989.
J. S. Barbanell, et al., "Holographic Analysis of the Characteristics of Relief Recording Media," Opt. Spectrosc. (USSR), 58(4) Apr. 1985, pp. 533–537.
J. S. Barbanell, et al., "Holographic Analysis of Phase Media with Absorption", Opt. Spectrosc. (USSR), 60(3), Mar. 1986, pp. 365–369.

*Primary Examiner*—Thomas G. Black
*Assistant Examiner*—Ellis B. Ramirez
*Attorney, Agent, or Firm*—Limbach & Limbach

[57] ABSTRACT

An automatic, multi-use device for measuring the transfer function of any nonlinear continuous network or network component. Transfer functions (also known as input/output reactions) are the main characteristics of all communication and information processing systems. Their evaluation, in the general case, is an elaborate problem. The conventional evaluation procedure had been to linearize the problem, but this procedure was inaccurate in principle and time-consuming. The method of the invention includes the steps of measuring a set of harmonics resulting from application of one (or two) single-frequency sinusoidal signal(s) to the network of interest, and then processing the measured data. The measurement operation is extremely simple. For most networks, only a small number of harmonics of the network's response to a single sinusoidal input signal need be measured. In no case is it necessary to measure more than two sets of harmonics, each for the network's response to a different one of two sinusoidal input signals. To perform the required signal processing steps, a simple, inexpensive processor is employed to solve a single set of equations derived from a set of integral equations which describe, in general, any continuous network. The system of the invention employs standard transducers of the type which convert measured data to electrical signals, to measure the data to be processed. Repetitive performance of the inventive method with respect to changing frequency provides the real-time response in terms of frequency-dependent phase and amplitude transfer functions.

23 Claims, 2 Drawing Sheets

METHOD AND SYSTEM FOR TRANSFER FUNCTION MEASUREMENT

BACKGROUND OF THE INVENTION

Transfer functions (input-output reactions) are the basic and recognized parameters which describe any system, including radioelectronic, electronic, mechanical, optical systems (and the like), their combinations, and derivative systems.

Two standard subclasses of these functions are referred to as amplitude and phase transfer functions; these correspondingly describe the amplitude to amplitude, or the phase to phase behavior of the system under analysis. Being frequency dependent, both of the named functions form corresponding subclasses of the so-called "spectral" characteristics of the systems. Usually, given the set of the above mentioned functions, the system becomes fully described.

But the task of evaluation of transfer functions represents a very sophisticated problem both mathematically and experimentally for all of the systems mentioned above.

Without describing the numerous methods for evaluation of the said characteristics and without itemizing their disadvantages, some observations should be considered. The evaluation of the basic functions which describe a system represents such a sophisticated problem, that usually the system is "linearized", i.e., a linear approximation of the transfer function(s) is applied. Then the system is considered to be linear.

It is recognized though, that non-linear systems provide the most effective functioning results. Linearization proves additionally, to be absolutely ineffective in the evaluation of phase transfer functions; phase-systems are always non-linear, even when their transfer functions are linearized. That disadvantage is easily seen when phase-registering media (or phase-transceiving networks) are analyzed.

For phase media (such as optical video disks and audio-disks, optical recording media for computers, media for standard audio recording, etc.) the said problem manifests itself in the fact that the corresponding functions are evaluated experimentally, using the "trial and error method". Stated simply, many experiments must be performed, during which separate and finite inputs are applied, while the corresponding outputs are measured.

Such evaluations are always time-consuming, complicated experimentally, and inaccurate. This is especially true in optical networks where relief media shifts of about of $\frac{1}{4}$ of a wavelength should be accounted for. Even with such problems being present, the basic functions of the system(s) are evaluated which provide the basis for future qualitative and quantitative assumptions and predictions.

The basic reason affecting the mentioned complexity is that the general mathematical description of complex (amplitude-phase) non-linear systems is very sophisticated. Though the basic equations can be written down, they represent in the general case, a set of integral equations of N-th order, where additionally, the functions under the integral signs are complex-valued.

In principle, with the help of powerful computers (at considerable computing time and expense) such a set can be solved for a finite and small number of equations. The corresponding algorithms are very sophisticated though, and even for the simplest non-linear networks cannot be realized in a real-time mode.

The mentioned set of integral equations for the special case of a non-linear optical network has been solved, as described in "Holographic Analysis of the Characteristics of Relief Recording Media," Opt. Spectrosc. (USSR), 58(4), Apr. 1985, pp. 533-537; and "Holographic Analysis of Phase Media with Absorption," Opt. Spectrosc. (USSR), 60(3), March 1986, pp. 365-369 (referred to hereinafter as "ref. [1]" and "ref. [2]", respectively), of which the inventor is an author, with the solutions being represented by simple algebraic equations. The inventor has now formulated a general solution applicable in the context of any continuous nonlinear network and has formulated both an experimental procedure and corresponding programmed microprocessor for the evaluation of transfer functions.

SUMMARY OF THE INVENTION

Because there are multiple advantages resulting from the claimed invention, these advantages are individually stated below for emphasis.

1. Because the inventor has found the mentioned algebraic solutions in a universal and general form, only an extremely simple, small, and inexpensive programmed microprocessor need be employed to determine transform functions in accordance with the invention. For example, a programmed microprocessor less "sophisticated" than a standard non-scientific calculator is suitable for implementing the required signal processing steps of the invention.

2. With negligible calculation time, the invention determines transfer functions in real-time for any reasonable precision required. This precision itself can be made variable by incorporating a corresponding parameter control in the inventive signal processing means. The manner in which the inventive system may be designed to achieve such variable precision is a result of the inventor's derivation of corresponding mathematical results.

3. The system or element under analysis always is assumed to be complex (amplitude-phase). The microprocessor under claim automatically and separately defines and evaluates both phase and amplitude transfer functions. If the system under analysis is either amplitude or phase solely, then the invention determines only the corresponding transfer function (the other transfer function is equal to zero or to d.c. in this case).

4. If there is some a priori information about the system behavior being either solely amplitude or phase, the structure of the microprocessor simplifies and the evaluation time is halved. A corresponding parameter control can be structurally incorporated in the inventive microprocessor.

5. One aspect of the invention is a very simple procedure for acquiring the measured input data to be processed. The set of input parameters is usually measured by performing a single experiment (or in some cases two). The measured input data is then processed to determine the full transfer function in the interval between its boundary limits. The number of the input set of measured data is very small and does not exceed twenty-one, which is an additional advantage for computational purposes.

6. The claimed method, and the claimed microprocessor (which preferably operates under control of digital electrical signals) have universal applications. They can be used to determine the transfer functions of any system, whether optical, radioelectronic, mechanical, or some other type. The differences in these embodiments manifest themselves in use of standard but different transducers, which transform the measured output signal into an electrical signal for convenient processing. In radioelectronics, for instance, such a transducer is a standard spectrum analyzer. In optics, for instance, it is the combination of a scanning standard photoelement and spectro-analyzer, etc.

7. The main advantage of the method under claim is that it determines the transfer function of interest as a whole, while requiring only one (or two) output signal measurements. In contrast, conventional evaluation approaches deal with "linearized" portions of the transfer function which are afterwards combined to represent the transfer function as a whole. This approach assumes that the linear combination of linear portions can describe the non-linear function which is not in fact true.

The method under claim additionally provides a general, analytical representation of each determined transfer function in the form of formulae. These later can be plotted for illustrative purposes. All conventional methods, on the contrary, apply the opposite methodology: they require that the transfer functions be plotted by application of the above-mentioned "point-by-point" techniques, and that the plotted curves then be approximated to produce a "general" formal solution, if necessary. The advantages of direct determination of an exact formal representation in accord with the invention can be easily seen in the applications of general analysis and synthesis of complicated networks, elements, etc., and for automatic conveyor production control.

DETAILED DESCRIPTION OF THE PREFERRED EMBODIMENT

The claimed invention measures the transfer functions of continuous passive networks (and network elements) only. If any active elements (such as generators or oscillators) are present in a system to be measured, it is suggested by the inventor to divide the system under analysis into separate parts, consisting of passive parts only. The corresponding transfer functions of the passive parts can then be combined, which in effect excludes the active element(s). To deal with digital networks, they can be treated like a continuous analog network and can be then digitized afterwards. Such an approach is commonly utilized in network analysis.

A transfer function has the general form: $T = M_1(H)\exp(jM_2(H))$, where $M_1(H)$ is the amplitude transfer function, $M_2(H)$ is the phase transfer function, and H is an exposure parameter (of the type described, for example, in ref. [1] and ref. [2]).

For some systems, one or both of $M_1$ or $M_2$ is a constant (i.e., is independent of the input parameter H). Such systems are said to have only an amplitude transfer function (if $M_2$ is a constant), or a phase transfer function (if $M_1$ is a constant). The invention determines both $M_1$ and $M_2$ by measuring and processing harmonics of a nonlinear system's response to a pair of sinusoidal input signals, and determines either $M_1$ or $M_2$ (in the case that the other one of $M_1$ and $M_2$ is a constant) by measuring and processing harmonics of a nonlinear system's response to a single sinusoidal input signal.

A previously published mathematical procedure (ref. [2]) deals with "negative" frequencies, which are absent in the standard understanding of electronic networks. An important aspect of the present invention is to deal with such "negative" frequencies in a practical manner.

The general mathematical approach set forth in this specification automatically introduces another minor limitation. The generality of the mathematical analysis requires the definition of the transfer function under analysis within a given interval of the arguments; i.e., the dynamic range of the transfer function should be known a priori. This is based on the standard mathematical procedure of defining the function itself. This limitation cannot be bypassed within of the boundaries of the mathematical approach developed in ref [2]. For any network elements or networks under analysis, the dynamic range usually is given. The inventor though, limitation. In the case when the dynamic range of the system under analysis has definite but approximately known boundaries, the test input signal should be applied within those boundaries. If the test input signal extends outside the dynamic range boundaries, it will result experimentally in a predictable and substantial increase in the level of all the measured harmonics resulting from the test input signal (such measured output signal harmonics are measured at the input signal harmonic frequencies, and hence will be referred to herein as "measured input signal harmonics" or the like). Of course such an approach is an empirical one, but it deals with the minor limitation in those rare cases when the dynamic range has not been defined a priori.

Figure 1:
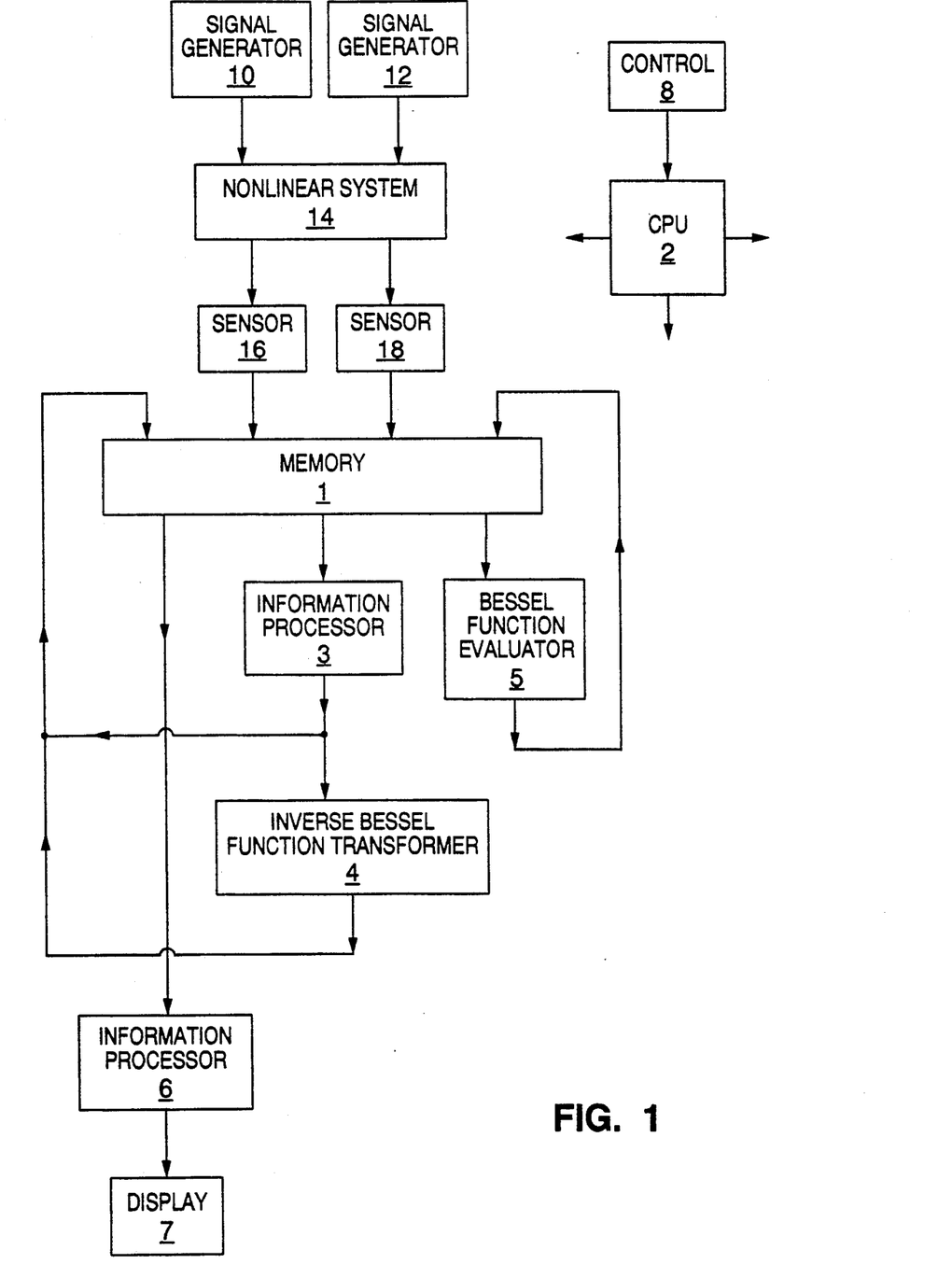
FIG. 1 is a block diagram of a preferred embodiment of the inventive system.

A preferred embodiment of the inventive system will next be described with reference to FIG. 1. In FIG. 1, the digital interpretation of each circuit block is a straightforward task of Boolean Algebra synthesis.

The inventor's mathematical analysis implies the input signal for the system (or element) under evaluation to have a simple form of an amplitude-modulated sinusoidal wave:

$$A' = \overline{A}_0(1 + a(\cos \omega t)) \quad (1)$$

in which $A'$ is the amplitude of the signal; $\overline{A}_0$ is a given d.c. value; "a" is a constant representing a given value of the amplitude modulation (the latter two constants being defined by the given boundaries within which the transfer function is evaluated); "$\omega$" is the frequency at which the transfer function is evaluated; and t is a generalized coordinate (for electronic and radio networks, for example, t denotes time).

Such a signal for all temporal networks is easily produced by standard signal generators. For spatial network analysis, a signal in the form (1) is produced by the recognized technique of applying two coherent and inter-correlated waves; their corresponding angle of orientation provides the required spatial frequency. In this case, t denotes a spatial coordinate.

The measured data (sometimes referred to as input data) is represented by the set $\{A_i\}_{i=1}^N$ where the $A_i$ are the amplitudes of the measured harmonics stored in memory cells 1 in FIG. 1, measured by sensor 16 or sensor 18 at the output of system 14 under analysis. This required information is supplied by a scanning photodetector for spatial networks and by a standard spectrum analyzer for temporal networks.

For a complete analysis of a non-linear network, the mathematical approach of ref. [2] suggests the use of an additional set of "negative" frequencies, which do not exist in the temporal networks. To make the inventive procedure workable and conveniently applicable, the inventor suggests that input data to be stored in memory cells 1 be measured in response to two input test signals. The rationale for this suggestion may be appreciated by considering the mathematical transform detailed below.

All the following transformations deal on the functional level with Bessel functions of first order of the real-valued argument b (denoted $J_1(b)$). The Bessel functions of the "minus-first" order, having been present in the cited references (ref. [1] and (ref. [2]), produced the mentioned demand for the set of negative frequencies.

Recognizing that the Bessel function is uneven both by argument and by index, so that in the simplest form:

$$J_{-1}(b) = J_1(-b) \quad (2)$$

the inventor has invented a new form of the input test signal. This new signal eliminates the requirements for "negative" frequencies for determining the transfer functions of spatial networks and provides a general application of the inventive method both to spatial and temporal networks. It is suggested that to provide the required additional set of $\{A_{-i}\}_{i=0}^N$, while using the relationship (2), the second input signal should be generated in the form:

$$A^* = \tilde{A}_0(1 - a(\cos \omega t)) \quad (3)$$

where all the denominations are the same as in equation (1).

The set of amplitudes $\{A_{-i}\}$ of the measured harmonics produced in response to the second input signal (3) is measured easily by a standard spectrum analyzer. The two measured harmonic amplitude sets (produced in response to the first and second input signals) form all the necessary information required to evaluate the transfer function.

Both sets of measured input harmonic amplitudes $\{A_i\}$ and $\{A_{-i}\}$ in the general case might include alternating sign terms.

The suggested experimental procedure is very simple and straightforward and includes two measurements for temporal networks and one for spatial networks. The resulting measured output data is processed to fully determine the transfer functions under evaluation.

The required fixed number, N, the number of measured input signal harmonics, corresponds to the possible number of harmonics to be measured, but mathematical analysis shows that N, for any reasonable accuracy of the transfer function evaluation up to $10^{-6}$, need not exceed 7. That means that the set of input parameters (i.e., measured input signal harmonics) to be stored in permanent memory cells 1 of the device under claim will not exceed 15 for any reasonable application. For far greater accuracy, which may be required for special applications, no more than twenty-one cells of permanent memory for the input data will be necessary.

Having discussed the experimental procedures, the number of harmonics required to be measured for use as processor input data, and the number of corresponding cells 1 of permanent memory required, the transfer function analyzer itself can now be discussed. The general term "transfer function analyzer" will be used to denote a dedicated microprocessor, and also a computer program (subroutine), which may be stored for example, on a floppy disk.

The generalized block diagram of the inventive system is represented by FIG. 1, where:

elements 1 are cells of permanent memory for processor input data (i.e., measured input signal harmonics) sets $\{A_i\}_{i=1}^N$; $\{A_{-i}\}_{i=1}^N$ and $A_0$;

element 2 is a Central Processing Unit (CPU);

element 3 is a first information processor (arithmetic function device);

element 4 is an Inverse Bessel Function Transformer (IBFT);

element 5 is a Bessel Function Evaluator (BFE);

element 6 is a parallel information processor (another arithmetic function device, which may be included within first information processor 3 in alternative embodiments of the invention);

element 7 is a display means;

element 8 is a control means (i.e., a knob) for setting the precision of the transfer function calculation to a value within a predetermined range;

elements 10 and 12 are signal generators for generating, respectively, the first and second input test signals described herein (it should be appreciated that a single signal generator capable of producing two input test signals may be substituted for pair of signal generators 10 and 12);

element 14 is the nonlinear system to be measured (element 14 may be an electrical network, for example); and elements 16 and 18 are sensors for measuring, respectively, a set of harmonics of the response by system 14 to the first and second input test signals.

All the elements, using standard principles of computer construction, are connected and "fed-back" to CPU 2 which monitors all procedures (subroutines). The task for the transfer function analyzer under claim is to evaluate two sets of unknown coefficients (see refs. [1] and [2]):

$$\{x_k(\vec{\gamma}^0)\}_{k=1}^N \text{ and } \{y_k(\vec{r}^0)\}_{k=0}^N \quad (4)$$

which correspondingly describe the phase and amplitude transfer functions under evaluation.

The polynomial representation of these functions assures any degree of non-linearity, demanding only that the transfer functions be continuous, i.e., belong to the class $L_2$. Any discontinuity in the transfer function (i.e., membership in a class wider than $L_2$ but not in the class $L_2$) would automatically require an infinite bandwidth of the corresponding system. Such requirement is not physically realizable.

In FIG. 1, all of elements 1, 3, 4, 5, 6, 7, and 8, are to be connected to CPU 2 (although some of the connections are not shown for clarity), and the corresponding command signals are not itemized in the description below for clarity.

After all the input data has been stored in memory cell elements 1, a command signal from CPU 2 commands the values $A_1$, $A_{-1}$, and $A_0$ from corresponding memory cells to be fed to first information processor 3 which computes:

$$(A_1 - A_{-1})/A_0 = R \quad (5)$$

The computed value R is then fed to Invense Bessel Function Transformer (IBFT) 4, which generates a coefficient signal $\gamma_1^0$ using the relation having the closed form:

$$J_1(\gamma_1^0)/J_0(\gamma_1^0) = R_1 \qquad (6)$$

where $J_1$ and $J_0$ are the Bessel functions of order 1 and 0 correspondingly. The task of computation is greatly simplified by the following:
a) Bessel functions of any order are represented by the same compact polynomial expansions;
b) Because all the arguments $\gamma_1^0$ are relatively small-valued, the solution for the inverse Bessel functions is unambiguous, and only the first three or four terms of the corresponding series are usually needed for any reasonable required accuracy.
c) The "inverse Bessel operators" of any order are easily derived or computed;
d) If a higher precision is desired, additional term(s) of the Bessel function series expansion should be used.

Because Bessel function computations are widely known, and used for designing Inverse Bessel Function Transformer (IBFT) circuits, IBFT 4 may be a conventional microchip of the type used in some models of personal scientific calculators.

Element 4 thus determines the first value from the set of intermediate coefficients $\{\vec{\gamma_k^0}\}_{k=1}^N$, and feeds such determined value to memory cells 1, where the values $A_0$, $A_1$, and $A_{-1}$ were originally stored. The latter values are not used in future computations, and therefore they need not be stored in any permanent memory cell. The signal $\gamma_1^0$ is then fed to Bessel Function Evaluator (BFE) 5, wherein the needed additional set of $\{R_k\}_{k=2}^N$, is derived (using the techniques described in refs. [1] and [2]) in the form of the concise algebraic equation:

$$J_k(\gamma_1^0)/J_0(\gamma_1^0) = \{R_k\}_{k=2}^N \qquad (7)$$

Element BFE 5 is introduced to simplify the explanation of the manner in which the claimed device functions. In a preferred embodiment, element 5 may be omitted and all the required operational functions formerly performed by BFE 5 (and above-described IBFT 4) performed instead by a single commercially available chip which replaces IBFT 4.

During both the computation of set of coefficients $\{R_k\}$ shown in equation (7) and the determination of the coefficient $\gamma_1^0$ shown in equation (6), the equations are given as the functions of a defined parameter k, and the computation is performed k-sequentially, so that the volume of the required permanent memory storage does not increase (no additional memory cells 1 are required). All the needed command signals to determine the order of computations, for each separate fixed value of parameter k, are supplied by CPU 2.

Using the computed $\gamma_k^0$, k-fixed, having been stored in one of empty memory cells 1, the values of $R_k$, $A_k$, and $A_{-k}$ are fed to the input of first information processor 3. Then these computed values are fed to the input of IBFT 4. At the output of IBFT 4, emerges the set of needed values of intermediate coefficients $\{\gamma_k^0\}$; $\{\nu_k^0\}$ described by equations:

$$\frac{J_1(\gamma_k^0)}{J_0(\gamma_k^0)} = \frac{(A_k - A_{-k})}{A_0} + \frac{1}{2}[(-1)^k R_k - R_k]. \qquad (8)$$

where $k = 2, 3 \ldots N$; and $$\frac{\nu_k^0}{\nu_0^0} = \frac{(A_k - A_{-k})}{A_0} - \frac{1}{2}[(-1)^k R_k - R_k]. \qquad (9)$$

where $k = 2, 3 \ldots N$.

The number of the said coefficients being equal to the number of input data parameters, the former are sequentially stored in corresponding permanent memory cells 1, and the initial input data (now obsolete) are erased.

To evaluate $\nu_0^0$, a separate but very simple different equation is used:

$$\nu_0^0 = \frac{A_0}{A_0 \prod_{k=1}^N J_0(\gamma_k^0)} \qquad (10)$$

When the corresponding signals from CPU 2 are provided to memory cells 1, the computed result is returned to one of memory cells 1.

After completing this stage, two sets of intermediary coefficients are stored in the same twenty-one cells 1 of permanent memory forming two linear triangular sets of equations. In response to a control signal provided from CPU 2, these are fed (one set at a time) to the input of second information processor 6, which provides the solutions to corresponding sets of equations represented in the simple form:

$$\sum_{k=1}^N \sum_{m=k}^N x_m a^m \frac{\binom{2m}{m-k}}{2^{m-1}} = \gamma_k^0. \qquad (11)$$

$$\sum_{k=0}^N \sum_{m=k}^N y_m a^m \frac{\binom{2m}{m-k}}{2^{m-1}} = \nu_k^0. \qquad (12)$$

where () denotes the combinatorial coefficient.

To solve these equations, a known closed algorithm can be utilized. The inventor suggests use of Gauss's method, because then the corresponding matrices for triangular sets (11) and (12) may easily be inverted.

To appreciate an additional advantage of the inventive method in terms of simplification and reduced computer time, one should consider the new combinatorial coefficients in the equations of suggested sets (11) and (12). They were derived by means of combinatorial analysis and represent the combinatorial convolutions of the much more elaborate combinatorial coefficients present in the corresponding equations in refs. [1] and [2].

Expression (13) set forth below represents the general form of the transfer function. The term:

$$\frac{\binom{2m}{m-k}}{2^{m-1}}$$

in expression (16) set forth below is a simplification of expressions (14) and (15) set forth below. It is installed in expression (16) which corresponds to expression (13). The validity of the inventive method is mathematically proven by expression (16), from which it can be easily seen that the amplitude of each output harmonic is dependent on all the harmonics which describe the transfer function under evaluation.

From expressions (13) and (16), it is seen that a single sinusoidal input signal affects each and every one of said amplitudes of the output harmonics.

Expressions (13) through (16) are as follows:

$$\sum_{k=0}^{N} x_k [b(d - \cos\mu)]^k \iff \tag{13}$$

$$Q(2\xi) = \sum_{K=2\xi}^{N} x_k b^k \left\{ \sum_{p=k_{min}=2\xi}^{k} \left[ \frac{\binom{p}{\frac{p - k_{min}}{2}}}{2^p} - (-1)^p \frac{\binom{p}{\frac{p - k_{min}}{2}}}{2^p} \right] \binom{k}{p} d^{k-p} + \delta(\xi - 0)d^k \right\} \tag{14}$$

where $\xi = 1,2,3 \ldots \frac{N}{2}$ ; and $$Q(2\xi - 1) = \sum_{K=2\xi-1}^{N} x_k b^k \sum_{p=k_{min}=2\xi-1}^{k} \left[ \frac{\binom{p}{\frac{p - k_{min}}{2}}}{2^p} - (-1)^{p-1} \frac{\binom{p}{\frac{p - k_{min}}{2}}}{2^p} \right] \binom{k}{p} d^{k-p} \tag{15}$$

where $\xi = 1,2,3 \ldots \frac{N}{2}$ $\iff$ $$\sum_{\mu=0}^{N} \sum_{k=\mu}^{N} X_k b^i d^k \left[ \frac{\binom{2k}{k - \mu}}{2^{k-1}} \right] \tag{16}$$

In the form presented in refs. [1] and [2]; just the computation of the coefficients while using expressions (14) and (15) would have represented a very difficult problem.

The solution of the sets (11) and (12) provides the sets of required coefficients $\{x_k\}_{k=1}^{N}$, $\{y_k\}_{k=0}^{N}$ that are fed from the input of second information processor 6 to the memory cells 1, in which the previously stored information is erased. The said sets of coefficients which represent both the amplitude and phase transfer functions (with the degree of accuracy specified by the system user using control 8, to be described below), are fed to the input of second information processor 6. Employing another standard subroutine, the corresponding transfer functions are computed and displayed or printed by display means 7, which may be a CRT screen, or a standard plotter. Upon generation of such display or print-out, the required task of the specialized processor of the invention is fulfilled.

Some special additional advantages of the inventive device should be mentioned. Because all the mentioned subroutines are realized by existing closed algorithms, the corresponding procedures can be easily implemented both mathematically and structurally. In some cases already existing microchips can be used in construction of the inventive device.

The transfer function analyzer of the invention includes at most twenty-one memory cells 1 of permanent memory, because the number of input data parameters is exactly equal both to the vector sum of intermediary coefficients and to the sum of orders of the sets of algebraic equations being solved. This sum of orders fully provides the required precision and can be easily increased by similarly introducing additional input parameters. Any reasonable number of input parameters is always provided by the described one (or two) experiment(s).

In most practical applications, an order of 4 or 5 (i.e., N=4 or N=5), is absolutely satisfactory, providing at least a 0.1 percent accuracy of the evaluated transfer functions. In this case, the corresponding orders of the sets of algebraic equations and the direct and inverse Bessel function operators, etc., are represented by a small number of expansion terms, which simplifies the calculation process. Both the existence of corresponding closed algorithms and the analytical derivation of the combinatorial coefficients, even for higher precision modes, enables the inventive processor to perform the entire inventive method in real-time.

The required accuracy is regulated by a variable control 8 (which may be an external control knob) connected to CPU 2. In response to a precision control signal from control 8, CPU 2 correspondingly defines the number of measured input signal harmonics to be stored and processed by the inventive system, and the number of terms for the approximation of Bessel functions (and other signals) generated during operation of the inventive system. CPU 2 preferably controls the effective processing capability of the processing means employed in the inventive system (the number of significant bits of each signal generated by the processing circuitry) in response to the precision control signal from control 8. For example, in the case that only three measured input signal harmonics are to be processed, the inventive system will preferably employ processing means having much lower effective processing capacity than in the case that seven measured input signal harmonics are to be stored and processed.

The repetitive use of the same memory cells is required only for the sake of the FIG. 1 circuitry's simplicity. If this feature is not important in a particular application, an alternative embodiment of the inventive device using auxiliary memory cells can be employed. The structural implementation of the FIG. 1 device can be further optimized during the stage of Boolean Algebra synthesis.

Spectral characteristics (frequency dependent transfer functions) can be measured by repetitive application of the described procedure while varying the frequency $\omega$. In other words, a different input signal (having frequency $\omega$) is applied to the nonlinear system of interest in each repetition of the above-described procedure. Throughout the specification, including in the claims, the expression "nonlinear system" will be used to denote both the linear systems (a special case of continuous nonlinear system) and other continuous nonlinear systems.

In summary, the inventive universal multi-use transfer function analyzer includes a standard "action to electrical signal" transducer, and specialized processing means. For the sake of simplicity and real-time functioning a finite amount of input data, resulting from a measured set of input signal harmonic amplitudes, is processed. The measured input signal harmonics result from a single-frequency sinusoidal input signal, and are measured by a standard spectrum analyzer (or other suitable sensor). The specialized processing means consists of a set of permanent memory cells being two-way connected to a first information processor. The output of the first processor is connected to an Inverse Bessel Function Transformer, to the input of a Bessel Function Evaluator, and to a CPU. The output of the CPU is connected to a visual display means, and the CPU is two-way connected to all the other elements of the inventive system.

Preferably, the inventive system includes, for the sake of variable accuracy, a control (such as a knob) for changing its "precision-mode" of functioning (i.e., the number of significant bits in the signals generated by the system's processing elements).

Figure 2:
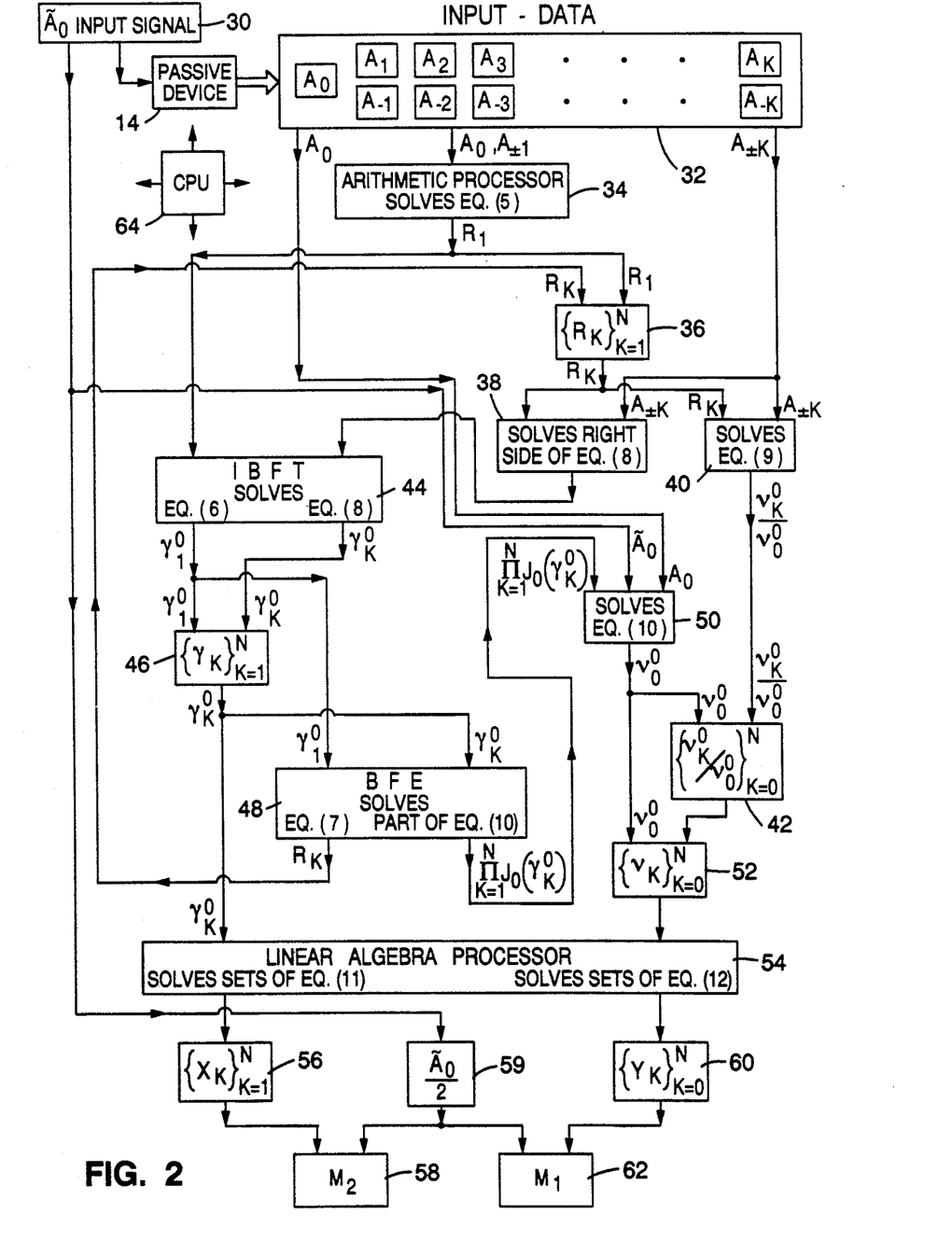
FIG. 2 is a flow chart representing the steps performed in a preferred embodiment of the inventive method.

FIG. 2 is a flow chart representing the steps performed in a preferred embodiment of the inventive method. In the general case, in response to a pair of input signals 30 applied to system 14 to be measured, the amplitudes of the lowest $2N+1$ harmonics 32 of the input signals 30 are measured and stored. The harmonics having positive order are measured in response to a first sinusoidal input signal having form described above, the harmonics formally having negative order are measured in response to a second sinusoidal input signal having form described above, and the "zeroth" order harmonic is the d.c. component of the system's response to the input signals.

Next (for example, in response to a command signal from CPU 64), in step 34, harmonic amplitudes $A_1$, $A_{-1}$, and $A_0$ are processed to determine the quantity $R_1$ in above-described equation (5).

At step 36, a signal representing the quantity $R_1$ ("signal $R_1$") is stored, and at step 40, the signal $R_1$ (stored in step 36) and harmonics $A_k$ and $A_{-k}$ are processed to solve the right side of equation (8). At step 44, signal $R_1$ is processed in an Inverse Bessel Function Transformer to generate the intermediate coefficient $\gamma_1^0$ (described above with reference to equation (6)) and the signal produced in step 40 is also processed in the Inverse Bessel Function Transformer to generate the other intermediate coefficients $\gamma_k^0$. During step 46, the intermediate coefficients generated during step 44 are stored.

During step 38, the signal R stored in step 36 (and in subsequent iterations of step 38, the data $\{R_k\}_{k=2}^N$ generated during step 48 discussed below) and harmonics $A_k$ and $A_{-k}$ are processed to solve the right side of equation (9). The ratio signals $\nu_k^0/\nu_0^0$ resulting from each iteration of step 38 are stored during step 42.

During step 48, the intermediate coefficient $\gamma_1^0$ stored during step 46 is processed in a Bessel Function Evaluator to generate the data $\{R_k\}_{k=2}^N$ described above with reference to equation (7), and the other intermediate coefficients $\gamma_k^0$ stored during step 46 are processed to generate a data representing the expression $$\left[ \prod_{k=1}^{N} J_0(\gamma_k^0) \right]$$

from equation (10). The signals $R_k$ are stored, and then employed to perform steps 38 and 40. The latter signal generated during step 48 is processed (with the harmonic amplitude $A_0$) at step 50 to generate a signal representing the coefficient $\nu_0^0$ from equation (10). The $\nu_0^0$ signal produced during step 50 using coefficient signal $A_0$ (defined above in Equation (1)), and the ratio signals stored during step 42 are processed during step 52 to generate signals representing the coefficients $\nu_k^0$ in equation (9).

During step 54, the coefficients $\nu_k^0$ from step 52 and the coefficients $\gamma_0^k$ stored during step 46 are processed in a linear algebra processor to generate coefficient signals $\{x_k(\vec{\gamma}^0)\}_{k=1}^N$ and $\{y_k(\vec{\nu}^0)\}_{k=1}^N$, which respectively describe the phase and amplitude transfer function of interest. The phase transfer function coefficients $\{x_k(\vec{\gamma}^0)\}_{k=1}^N$ are determined by implementing a solution for these coefficients in equation sets (11), and the amplitude transfer function coefficients $\{y_k(\vec{\nu}^0)\}_{k=1}^N$ are determined by implementing a solution for these coefficients in equation sets (12). The phase and amplitude transfer function coefficients are stored at steps 56 and 60, respectively.

The coefficients stored during step 56 are processed during step 58 to determine the phase transfer function $$M_2 = \left| \sum_{k=1}^{N} x_k' A^k \right| \tag{17}$$

$$A \in [0; 2\bar{A}_0]$$

The coefficients stored during step 60 are processed during step 62 to determine the amplitude transfer function $$M_1 = \sum_{k=0}^{N} y_k' A^k \tag{18}$$

$$A \in [0; 2\bar{A}_0]$$

Coefficients $\{x_k'\}$ and $\{y_k'\}$ are normalized.

Equations (17) and (18) correspond to the equations (5) and (4) in reference [2]. In particular, the constant $A_0$ in equations (17) and (18) corresponds to parameter H appearing in equations (2), (4), and (5) of reference [2].

Due to the very special form of coefficients $\{x_k'\}$ and $\{y_k'\}$ (see ref. [1]), the transfer functions can be expressed in the more simple, "normalized" form:

$$M_2' = \left| \sum_{k=1}^{N} x_k \left( \frac{A}{2A_0} \right)^k \right| \tag{19}$$

$$M_1' = \sum_{k=0}^{N} y_k \left( \frac{A}{2A_0} \right)^l \tag{20}$$

where $$A \epsilon [0; s\overline{A}_0]$$

Such representation serves the purposes of future simplification of the computation process.

As shown in FIG. 2, during step (59) at least one of the input signals 30 is processed to generate a signal representing constant $\overline{A}_0/2$. The signal generated during step 59 is employed during steps 58 and 62, to determine the amplitude and phase transfer functions.

Repetitive performance of the inventive method with respect to changing frequency provides the real-time response in terms of frequency-dependent phase and amplitude transfer functions.

The inventive method as described above, provides apriori limitations, based on the input data. These are as follows (see ref. [2]):

1. in the case when $$A_\mu = A_{-\mu} ; \mu = 1, 2, \ldots, N. \tag{21}$$

the transfer function is apriori known to be complex (amplitude-phase);

2. when $$A_\mu = A_{-\mu}; \mu = 1, 2, \ldots, N \tag{22}$$

the transfer function is purely amplitude; and 3. when $$\begin{cases} A_\mu = A_{-\mu} ; \mu\text{-odd} \\ A_\mu = A_{-\mu} ; \mu\text{-even} \end{cases} \tag{23}$$

the transfer function is purely phase.

Preferably these apriori limitations are recognized by preliminarily processing input data 32, so that the subsequent computation process can be simplified in the case that condition (22) or (23) is recognized to exist. Whenever the transfer function is apriori known to be solely amplitude or phase, the corresponding set of algebraic equations (12) or (11) can be addressed directly and the above-described general approach can be bypassed.

When the said information is absent or not utilized (i.e., when it is not determined which of conditions (21), (22), and (23) exists), the general approach provides the required results automatically, defining the required transfer functions even for the mentioned special cases. The computed results then show automatically the absence (or equality to d.c.) of the corresponding phase or amplitude transfer function. The inverse approach, though, is not valid. The supposition that half of the input data is equal to zero doesn't automatically produce the solution for the special cases of said purely amplitude or purely phase transfer functions.

Some additional input limitations also exist:

4. When $$A_\mu = 0, \mu = 2, 3, \ldots, N \tag{24}$$

the amplitude transfer function is linear.

5. And for the general case, the following is valid:

$$\sum_{\mu=1}^{N} \frac{A_\mu}{A_0} \leq 1 \tag{25}$$

Thus, if preliminary processing of input data 32 reveals that condition (25) is not satisfied, subsequent processing of the data will not determine a valid transfer function. Preferably, the inventive system will be programmed to automatically abort the data processing process in the event that condition (25) is not satisfied.

Various modifications and alterations in the structure and method of operation of the invention will be apparent to those skilled in the art without departing from the scope and spirit of this invention. Although a specific preferred embodiment of the invention has been described, it should be understood that the invention as claimed should not be unduly limited to such specific embodiment.

What is claimed is:

1. A system for measuring a transfer function of a nonlinear electrical network, including:
    a signal generator coupled to the network, for applying a single frequency, sinusoidal first input signal to the network and a single frequency, sinusoidal second input signal to the network, wherein the first input signal has amplitude $A' = A_0(1 + a(\cos \omega t))$, wherein $A_0$ is a d.c. value, "a" is an amplitude modulation constant, $\omega$ is the single frequency, and t denotes time, and wherein the second input signal has amplitude $A'' = A_0(1 - a(\cos \omega t))$, wherein "a" is said amplitude modulation constant and $A_0$ is said d.c. value;
    means for measuring amplitudes of first input signal harmonics produced in response to the first input signal and amplitudes of second input signal harmonics produced in response to the second input signal;
    processing means for processing the first input signal harmonic amplitudes and the second input signal harmonic amplitudes to determine the transfer function; and
    means for displaying a signal indicative of the transfer function.

2. The system of claim 1, wherein the processing means determines the transfer function by generating coefficient signals having closed compact form $$\frac{\binom{2m}{m-k}}{2^{m-1}}$$

where "k" is an integer in the range $0 < k < N$, and "m" is an integer in the range $k < m < N$, where "N" is a selected positive integer greater than two.

3. A method for measuring a transfer function of a nonlinear system, wherein the nonlinear system is a temporal network, including the steps of:
    (a) applying a single-frequency, sinusoidal first input signal to the nonlinear system, and applying a single-frequency, sinusoidal second input signal to the nonlinear system, wherein the first input signal has amplitude $A'=A_0(1+a(\cos \omega t))$, wherein $A_0$ is a d.c. value, "a" is an amplitude modulation constant, $\omega$ denotes a constant single frequency, and t denotes time, and the second input signal has amplitude $A''=A_0(1-a(\cos \omega t))$, where "a" is said amplitude modulation constant and $A_0$ is said d.c. value;

(b) measuring a set of first input signal harmonics resulting from application of the first input signal, and measuring a set of second input signal harmonics resulting from application of the second input signal; and (c) processing both the set of first input signal harmonics and the set of second input signal harmonics to determine the transfer function.

4. The method of claim 3, wherein a formal analytic solution for the transfer function is determined in step (c), and also including the step:

(d) displaying a visual representation of the formal analytic solution.

5. The method of claim 3, wherein the nonlinear system is an electronic circuit, and the first input signal is a current or voltage signal.

6. The method of claim 3, wherein the nonlinear system is an optical network.

7. The method of claim 3, wherein the nonlinear system is a mechanical system.

8. The method of claim 3, wherein the transfer function is an amplitude transfer function.

9. The method of claim 3, wherein the transfer function is a phase transfer function.

10. The method of claim 3, wherein N is less than or equal to five.

11. The method of claim 3, wherein the first and the second input signal harmonics include signals $A_\mu$, where $\mu = -N, -N+1, \ldots, 0, 1, 2, \ldots N$, and also including the step of:

processing the signals $A_\mu$ to determine whether the signals $A_\mu$ satisfy a first condition: $A_\mu = A_\mu$; or a second condition: $|A_\mu| = |A_{-\mu}|$ for odd $\mu$, and $|A_\mu| \neq |A_{-\mu}|$ for even $\mu$.

12. The method of claim 3, wherein the set of first input harmonics includes the lowest (N+1) first input signal harmonics, where N is an integer greater than one, and the set of second input harmonics includes the lowest N second input signal harmonics above the zeroth order harmonic, where N is said integer.

13. The method of claim 12, wherein the network is an electrical network.

14. The method of claim 12, wherein the network is an optical network.

15. A method for measuring a transfer function of a nonlinear system, including the steps of:

applying a test input signal having variable amplitude to the nonlinear system while monitoring harmonics of the response of the nonlinear system to the test input signal;

identifying an optimal dynamic range of the test input signal by determining the range of amplitudes of the test input signal outside which the amplitude of the harmonics predictably and substantially increases;

applying a single-frequency, sinusoidal, first input signal having a dynamic range within said optimal dynamic range to the nonlinear system;

measuring a set of first input signal harmonics resulting from application of the first input signal; and processing the set of first input signal harmonics to determine the transfer function.

16. A system for measuring a transfer function of a nonlinear system, wherein the transfer function possesses a phase transfer function component and an amplitude transfer function component, including:

a first signal generator connected to the nonlinear system, for applying a single-frequency, sinusoidal first input signal to the nonlinear system;

means for measuring a set of first input signal harmonics produced in response to the first input signal;

means for generating a second single-frequency, sinusoidal, input signal and applying the second input signal to the nonlinear system, wherein the first input signal has amplitude $A'=A_0(1+a(\cos \omega t))$, wherein $A_0$ is a d.c. value, "a" is an amplitude modulation constant, $\omega$ denotes a constant single frequency, and t denotes time, and wherein the second input signal has amplitude $A''=A_0(1-a(\cos \omega t))$, where "a" is said amplitude modulation constant and $A_0$ is said d.c. value;

means for measuring a set of second input signal harmonics produced by the nonlinear system in response to the second input signal;

processing means for processing both the set of first input signal harmonics and the set of second input signal harmonics to determine the phase transfer function component and the amplitude transfer function component; and means for displaying a signal indicative of the transfer function.

17. The system of claim 16, wherein the processing means includes:

(a) a set of memory cells for storing the set of first input signal harmonics, wherein the set of first input signal harmonics includes the signals $A_1$, $A_{-1}$, and $A_0$;

(b) means for generating a signal with value $(A_1 - A_{-1})/A_0 = R_1$, from the stored signals $A_1$, $A_{-1}$, and $A_0$;

(c) an inverse Bessel function transformer, for generating a coefficient signal $\gamma_1^0$ from the signal $R_1$;

(d) means for processing the coefficient signal $\gamma_1^0$ to generate coefficient signals $\{R_k\}_{k=2}^N$;

(e) means for processing the signal $R_1$ and the signals $A_k$ and $A_{-k}$ to generate coefficient signals $\gamma_k^0$;

(f) means for processing the coefficient signals $\gamma_k^0$ and the coefficient signals $R_k$, and the signals $A_k$, $A_{-k}$, and $A_0$ to generate signals $\nu_k^0$; and (g) means for processing the signals $\nu_k^0$ and the coefficient signals $\gamma_k^0$ to generate a set of coefficient signals which determine the transfer function.

18. The system of claim 17, wherein the coefficient signals $\gamma_k^0$ and $\nu_k^0$ have form $$\sum_{k=1}^{N} \sum_{m=k}^{N} x_m a^m \frac{\binom{2m}{m-k}}{2^{m-1}} = \gamma_k^0, \text{ and}$$

$$\sum_{k=0}^{N} \sum_{m=k}^{N} y_m a^m \frac{\binom{2m}{m-k}}{2^{m-1}} = \nu_k^0.$$

and wherein the means for processing the signals $v_k^0$ and the coefficient signals $\gamma_k^0$ generates a phase transfer function signal representing the values $$M_2 = \left| \sum_{k=1}^{N} x_k A^k \right|, \text{ where}$$

$A \in [0; 2\overline{A}_0]$ and an amplitude transfer function signal representing the values $$M_1 = \left| \sum_{k=0}^{N} y_k A^k \right|, \text{ where}$$

$A \in [0; 2\overline{A}_0]$.

19. The system of claim 17, wherein the means for processing the signals $v_k^0$ and the coefficient signals $\gamma_k^0$ generates a phase transfer function signal representing the values $$M_2' = \left| \sum_{k=1}^{N} x_k \left( \frac{A}{2\overline{A}_0} \right)^k \right| \text{ where}$$

$A \in [0; 2\overline{A}_0]$.

and an amplitude transfer function signal representing the values $$M_1' = \sum_{k=0}^{N} y_k \left( \frac{A}{2\overline{A}_0} \right)^k \text{ where}$$

$A \in [0; 2\overline{A}_0]$.

20. The system of claim 17, also including a control means connected to the processing means for supplying a precision parameter to the processing means, wherein the precision parameter specifies a precision with which the processing means determines the transfer function, and wherein the processing means is programmed to determine the transfer function with any precision specified by the precision parameter.

21. The system of claim 20, wherein the effective processing capability of the processing means is controlled in response to the precision parameter.

22. The system of claim 17, wherein the set of first input signal harmonics includes N+1 harmonics, where N is an integer greater than zero, and the set of memory cells includes N+1 permanent memory cells, where N is said integer.

23. A system for measuring a transfer function of a nonlinear system, wherein the transfer function consists of a phase transfer function and an amplitude transfer function, including:

means for measuring and storing a set of first input signal harmonics produced by the nonlinear system in response to a single-frequency, sinusoidal first input signal;

processing means for processing the set of first input signal harmonics to determine a first one of the phase transfer function and the amplitude transfer function; and means for displaying a signal indicative of the first one of the phase transfer function and the amplitude transfer function, and also including:

means for measuring and storing a set of second input signal harmonics produced by the nonlinear system in response to a single-frequency, sinusoidal second input signal, wherein the second set of harmonics includes the lowest N second input signal harmonics above the zeroth order harmonics, where N is an integer greater than one; and wherein the processing means includes means for processing both the set of first input signal harmonics and the set of second input signal harmonics to determine both the phase transfer function and the amplitude transfer function automatically and separately.

* * * * *